(12) United States Patent
Fukumoto et al.

(10) Patent No.: US 6,340,199 B1
(45) Date of Patent: Jan. 22, 2002

(54) ELECTRICITY FEEDING DEVICE FOR VEHICULAR SLIDE DOORS

(75) Inventors: Ryoichi Fukumoto, Nagoya; Katsuhisa Yamada, Toyota; Masao Ohhashi, Kariya; Shintaro Suzuki, Kasugai; Seiichi Suzuki, Aichi-ken, all of (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 0 days.

(21) Appl. No.: 09/461,234

(22) Filed: Dec. 16, 1999

(30) Foreign Application Priority Data

Dec. 16, 1998 (JP) .......................... 10-357090

(51) Int. Cl.[7] .................................................. B60J 5/06
(52) U.S. Cl. ..................................................... 296/155
(58) Field of Search ................................. 296/152, 155, 296/228; 49/27, 26; 174/117 F (56) References Cited

U.S. PATENT DOCUMENTS

| 4,606,146 A | | 8/1986 | Jozefozak |
| 4,652,772 A | * | 3/1987 | Shephard |
| 5,140,316 A | | 8/1992 | DeLand et al. |
| 5,178,435 A | | 1/1993 | Anderson |
| 5,361,540 A | | 11/1994 | Rogers, Jr. et al. |
| 5,552,565 A | * | 9/1996 | Cartier et al. |
| 5,581,944 A | * | 12/1996 | Kornbrekke et al. |
| 5,836,639 A | | 11/1998 | Kleefeldt et al. |
| 5,896,704 A | | 4/1999 | Neag et al. |
| 5,967,595 A | | 10/1999 | Heya et al. |
| 5,992,919 A | * | 11/1999 | Menke |
| RE36,428 E | * | 12/1999 | Moore et al. |
| 6,036,257 A | | 3/2000 | Manuel |
| 6,036,259 A | * | 3/2000 | Hertel et al. |
| 6,076,883 A | * | 6/2000 | Labonde et al. |
| 6,079,767 A | | 6/2000 | Faubert et al. |
| 6,089,649 A | | 7/2000 | Hamada et al. |
| 6,161,894 A | | 12/2000 | Chapman |

FOREIGN PATENT DOCUMENTS

| JP | 59-14520 | 1/1984 |
| JP | 6-000995 | 1/1994 |
| JP | 10-936 | 1/1998 |

OTHER PUBLICATIONS

Copending U.S. application No. 09/461,233 filed Dec. 16 1999.

Copending U.S. application No. 09/461,214 filed Dec. 16, 1999.

* cited by examiner

*Primary Examiner*—Joseph D. Pape
*Assistant Examiner*—Scott Carpenter
(74) *Attorney, Agent, or Firm*—Burns, Doane, Swecker & Mathis, LLP (57) ABSTRACT

An electricity feeding device for a vehicle slide door includes a flexible conductive portion having a curved portion, with the curved portion being moved in conjunction with movement of the slide door for opening and closing the opening area formed in the side wall of the vehicle body. The flexible conductive portion includes a wire electrically connecting components in the slide door and the vehicle body, an insulating member covering the wire, a belt made of metal such as steel that extends along the insulating member with the insulating member being mounted on the belt, and a cover member covering the belt and the insulating member in such a manner that the cover member is movable relative to the belt and the insulating member, and the belt is movable relative to the insulating member.

15 Claims, 11 Drawing Sheets

ELECTRICITY FEEDING DEVICE FOR VEHICULAR SLIDE DOORS

This application is based on and claims priority under 35 U.S.C. §119 with respect to Japanese Application No. 10(1998)-357090 filed on Dec. 16, 1998, the entire content of which is incorporated herein by reference.

FIELD OF THE INVENTION

The present invention is generally directed to vehicle slide doors. More particularly, the present invention pertains to an electricity feeding device which establishes an electric coupling between components in a slide door and a vehicle body.

BACKGROUND OF THE INVENTION

Japanese Utility Model Laid-Open Publication No. Hei. 6-995published on Jan. 11, 1994 without examination, discloses an electricity feeding device for a vehicle slide door. This electricity feeding device includes a flexible conductive portion which establishes an electrical coupling between components in the slide door and the vehicle body. The flexible conductive portion is configured to have a curved or U-shaped portion which is displaced in conjunction with movement of the slide door for opening or closing an opening area formed in a side wall of a vehicle body.

In this electricity feeding device, the flexible conductive portion is defined by a layered construction having a metal member and another member made of insulating material in which conductive wires are provided. The metal member is adhered or fixed to the insulating material member.

With this construction, at the curved or U-shaped portion of the flexible conductive portion which moves in conjunction with movement of the slide door, a curvature difference across the thickness direction of the curved portion is inevitably generated. This is disadvantageous from the standpoint of possibly causing separation of the insulating material member from the metal member in certain circumstances.

Accordingly, a need exists for an electricity feeding device drive that is not as susceptible to the drawbacks and disadvantages discussed above.

SUMMARY OF THE INVENTION

In light of the foregoing, the present invention provides an electricity feeding device for a vehicle slide door mounted on a vehicle body that includes a flexible conductive part having a curved portion that is moved in conjunction with movement of the slide door for opening and closing an opening area formed in the side wall of the vehicle body. The flexible conductive portion has a wire providing electrical connection between components in the slide door and the vehicle body, and an insulating member covering the wire. The insulating member is supported on a belt made of steel so that the belt is movable with respect to the insulating member. A cover member covers the belt and the insulating member so that the cover member is movable relative to the belt and relative to the insulating member.

According to another aspect of the invention, an electricity feeding device for a vehicle slide door mounted on a side wall of a vehicle body includes a flexible conductive part having a curved portion that moves in conjunction with movement of the slide door for opening and closing an opening area formed in the side wall of the vehicle body. The flexible conductive portion includes a wire encased within insulation and providing electrical connection between components in the slide door and the vehicle body, a support member on which the wire encased in insulation is supported, and a cover member extending around an entirety of the circumference of the support member and the wire encased within insulation.

In accordance with another aspect of the invention, a vehicle slide door apparatus includes a slide door mounted on the lateral side of the vehicle body for movement relative to the vehicle body between an open position and a closed position, and a flexible conductive part having a curved portion that moves in conjunction with movement of the slide door between the open and closed positions. The flexible conductive portion includes a wire encased within insulation and providing electrical connection between components in the slide door and the vehicle body, a support member on which the wire encased in insulation is supported, and a cover member extending around the entirety of the circumference of the support member and the wire encased within insulation.

BRIEF DESCRIPTION OF THE DRAWING FIGURES

The foregoing and additional features of the present invention will become more apparent from the following detailed description considered with reference to the accompanying drawing figures in which like elements are designated by like reference numerals and wherein.

DETAILED DESCRIPTION OF THE INVENTION

Referring to FIGS. 1–4, the electricity feeding device 10 of the present invention is adapted to establish an electric coupling between each of a touch sensor 13 and an inside door handle sensor 14 which are provided in a slide door 1, and a CPU 15 provided in the vehicle body. The electricity feeding device 10 includes a flexible conductive portion 10a having a curved portion 22 and operates in such a manner that the curved portion 22 is displaced with movement of the slide door 1.

Figure 6:
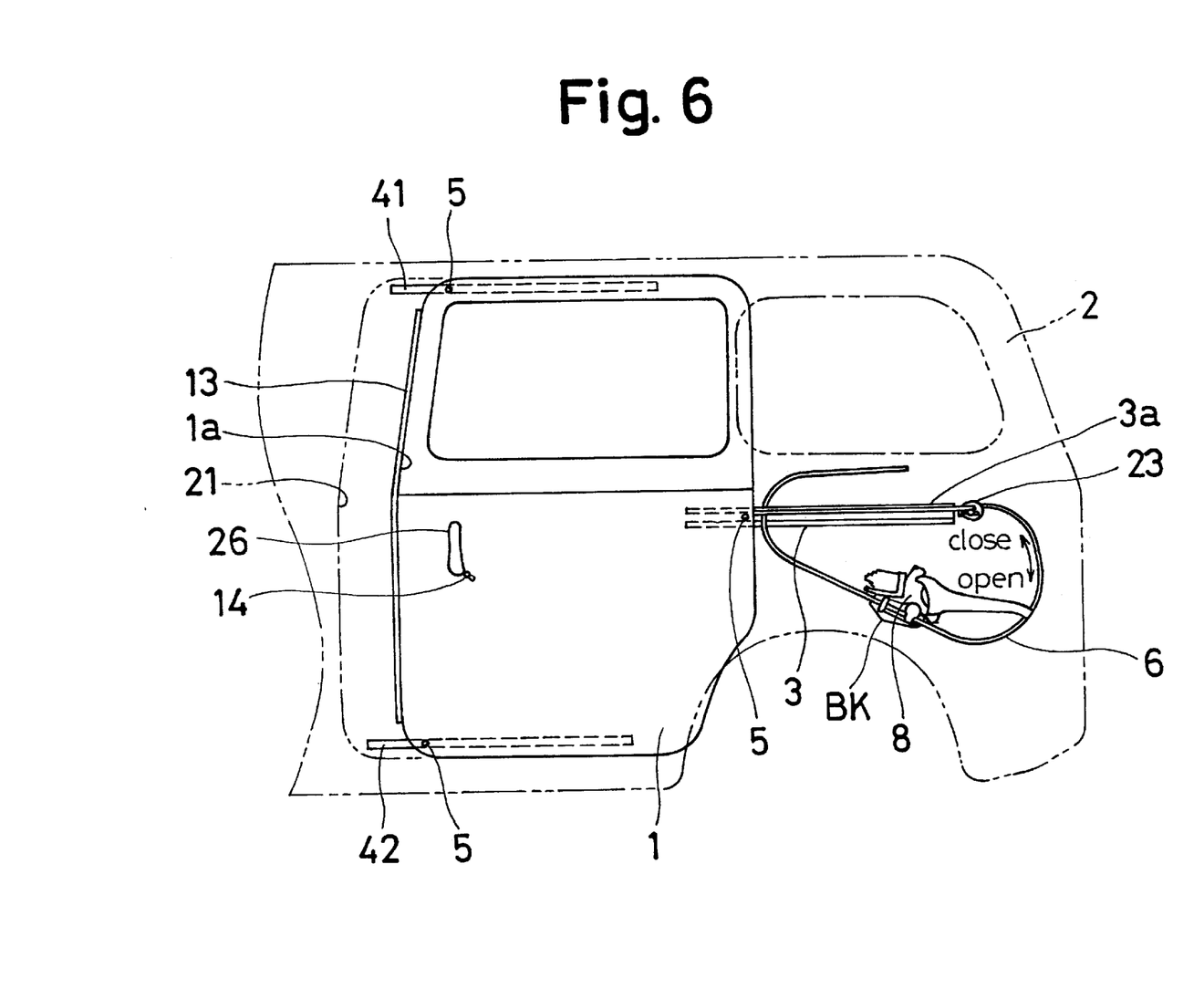
FIG. 6 is a side view of the lateral side of a van type vehicle on which is mounted the slide door.

Before explaining in detail the structural and operational characteristics of the electricity feeding device 10, a description of peripheral or related structure will be set forth. As shown in FIG. 6, the slide door 1 is movable between an open position and a closed position to open and close an opening area 21 formed in a lateral side wall 2 of a vehicle body. The slide door 1 is guided in the vehicular lengthwise direction (i.e., the right-left direction in FIG. 6) by a center guide rail 3, an upper guide rail 41 and a lower guide rail 42. The upper guide rail 41 is secured to the lateral side wall 2 so that the upper guide rail 41 extends parallel to the upper periphery of the opening 2a. The lower guide rail 42 is secured to the lateral side wall 2 so that the lower guide rail 42 extends parallel to the lower periphery of the opening 2a. The center guide rail 3 is secured to the lateral side wall 2 at the rear side of the opening 2a.

A roller unit 5 is provided at the rear end portion of the slide door 1 and is secured via pin (not shown) with a shoe (not shown) to which a geared cable 6 is connected. The geared cable 6 extends through the lateral side wall into the inner space of the vehicle by way of a grommet 23 located at the rear portion of the center guide rail 3. The geared cable 6 is adapted to move along the center guide rail 3 when driven by a drive unit or actuator which is secured to the inside of the lateral side wall 2. Other roller units 5, 5 are also provided at the front end portions of the slide door 1 as illustrated in FIG. 6. Thus, when the drive unit is turned on in one direction, the slide door 1 moves along the guide rails 3, 41, 42 towards the open position to open the opening area 21. On the other hand, when the drive unit is turned on or operated in the opposite direction, the slide door 1 moves along the guide rails 3, 41, 42 towards the closed position to close the opening area 21.

Figure 1:
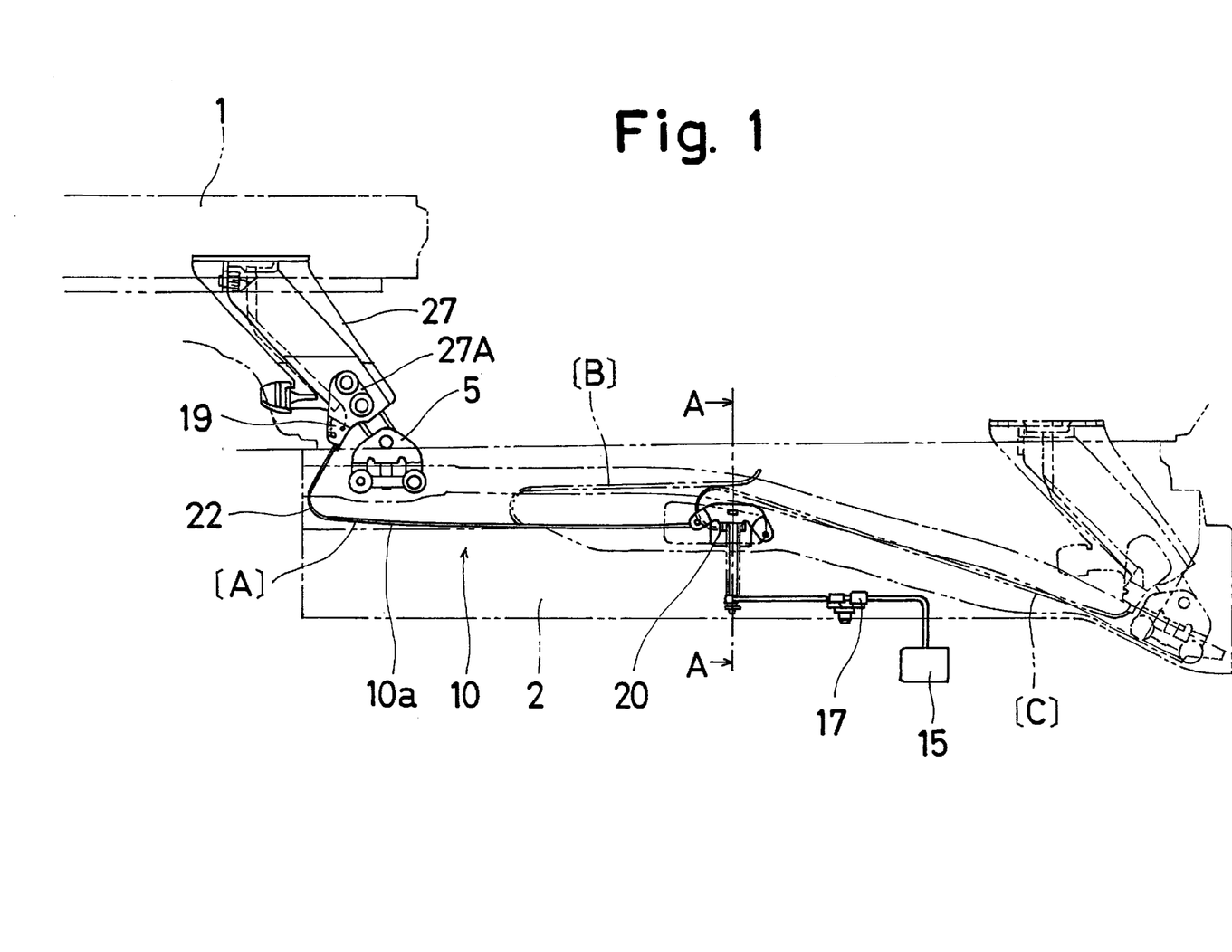
FIG. 1 is a plan view of a portion of a vehicle to which is provided the electricity feeding device according to the present invention.
Figure 2:
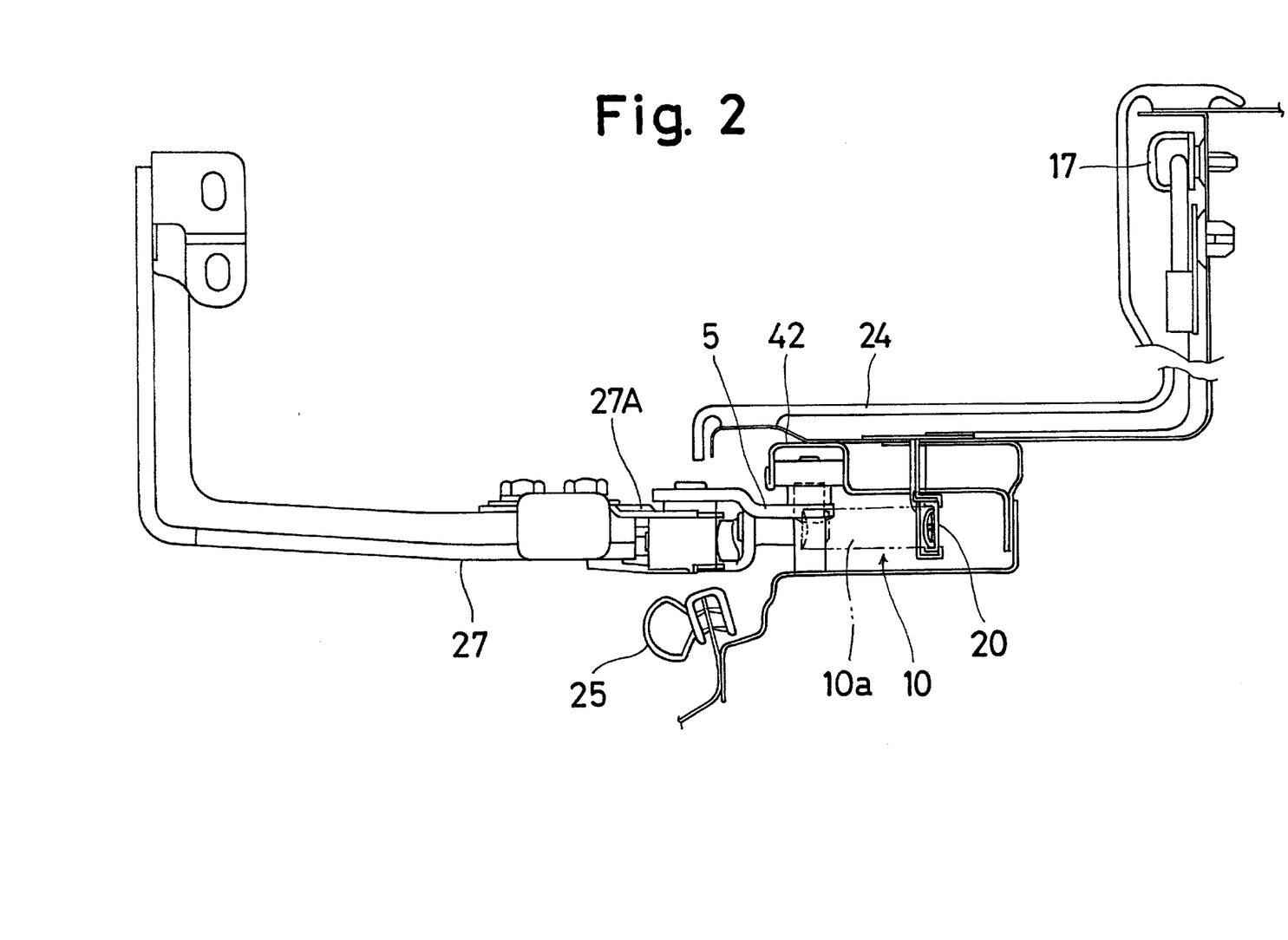
FIG. 2 is a cross-sectional view taken along the section line II—II in FIG. 1.
Figure 3:
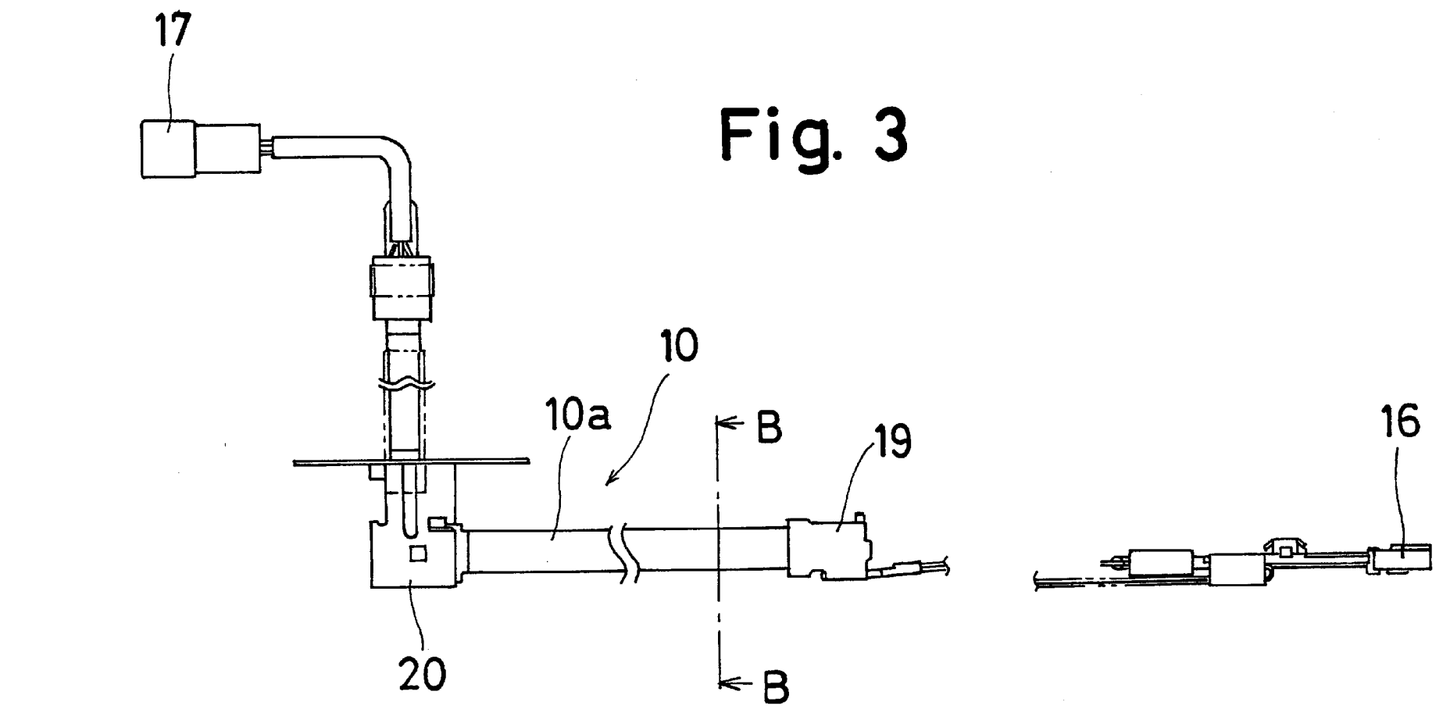
FIG. 3 is a front view of the electricity feeding device according to the present invention.

As shown in FIGS. 1 and 2, a lower arm 27 is interposed between the slide door 1 and the lower guide rail 42. This lower arm 27 establishes sliding movement of the slide door 1 relative to the lower guide rail 42. The lower arm 27 extends from the slide door 1 and terminates in a distal end to which the roller unit 5 is pivoted. A bracket 19 forming a part of the electricity feeding device 10 is secured by a screw (not shown) to a bracket 27A of the lower arm 27 in order that an overlapped relation exists between the roller unit 5 and the bent portion 22 of the flexible conductive portion 10a in the sliding direction of the roller unit 5. Thus, when the slide door 1 is moved for opening and closing the opening 21 in the lateral side wall 2, the roller unit 5 slides in the lower guide rail 42, thus causing sliding movement of the bracket 19 in the lower guide rail 42. Thus, as the bracket 19 changes its position, the bent portion 22 shown in FIG. 1 is displaced or moved. It is to be noted that in FIG. 2, reference numerals 24 and 25 denote a step and a weather strip, respectively.

Figure 7:
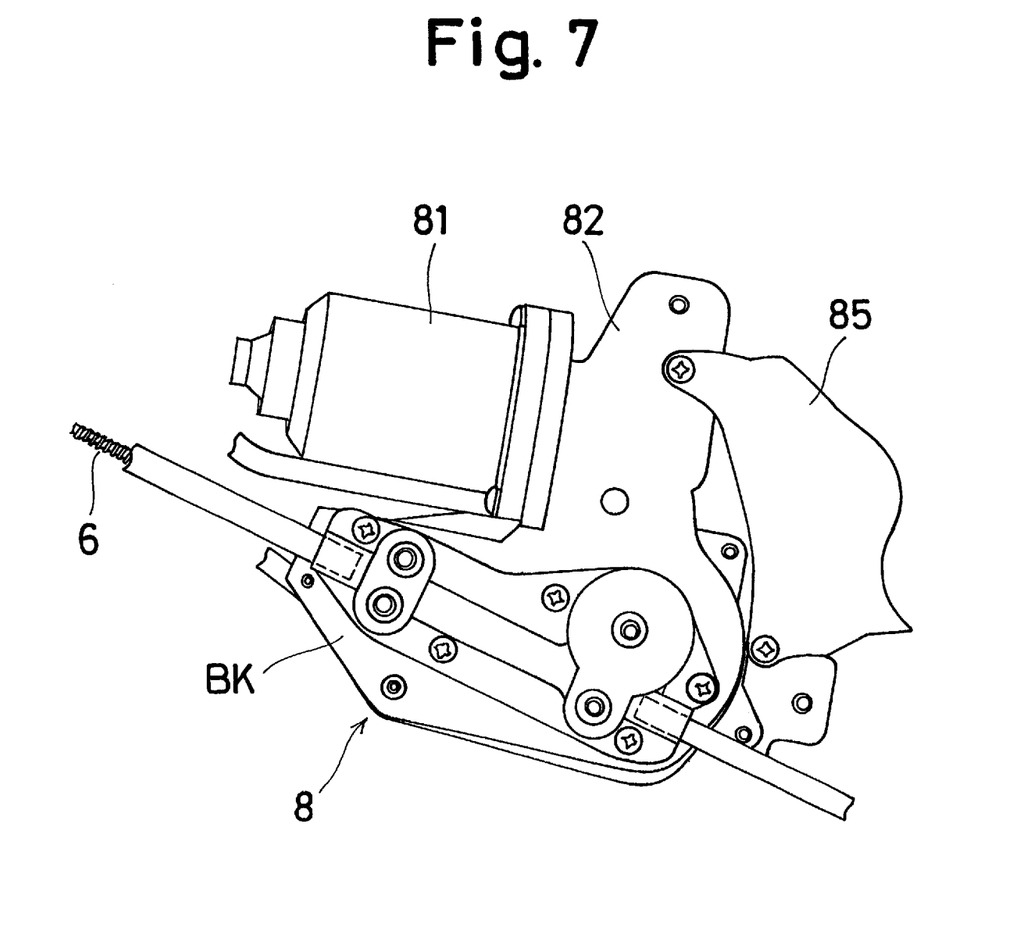
FIG. 7 is a side view of the drive device which drives the slide door.
Figure 8:
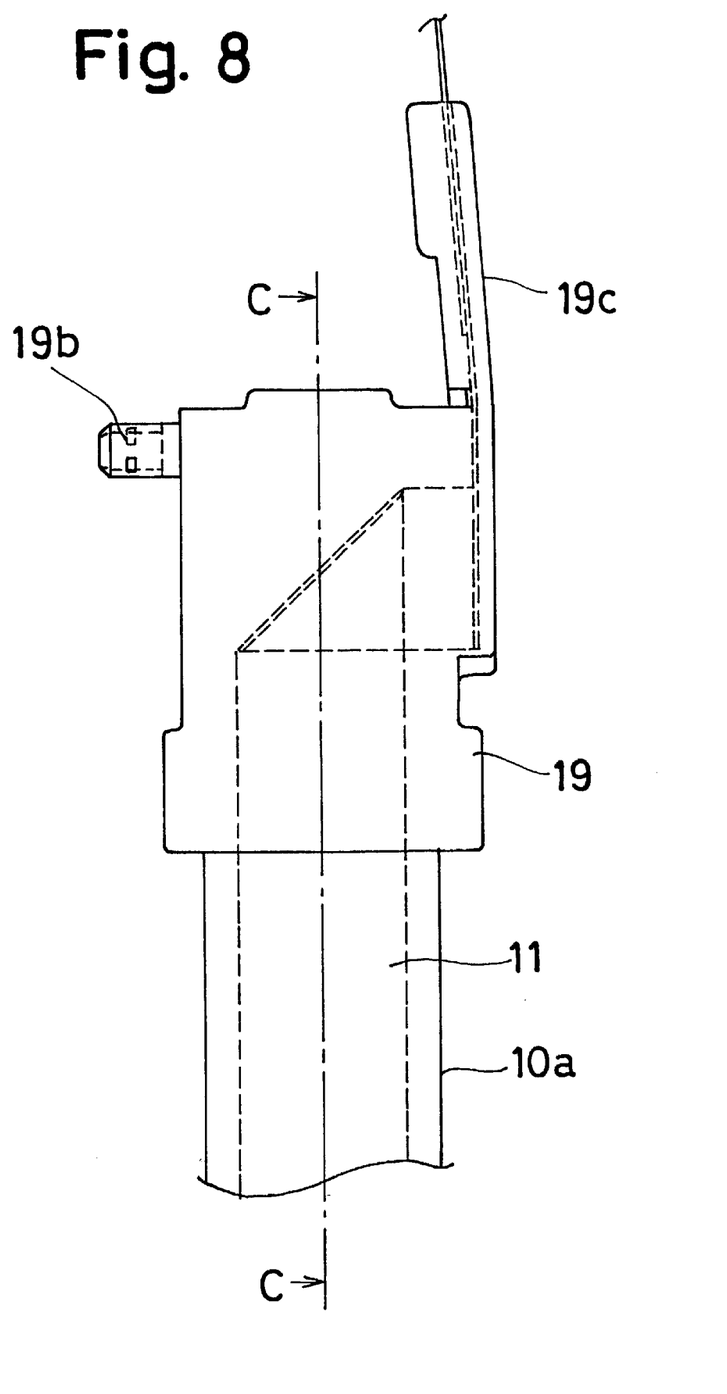
FIG. 8 is an enlarged side view of the bracket connected to one end of the flexible conductive portion of the electricity feeding device.
Figure 9:
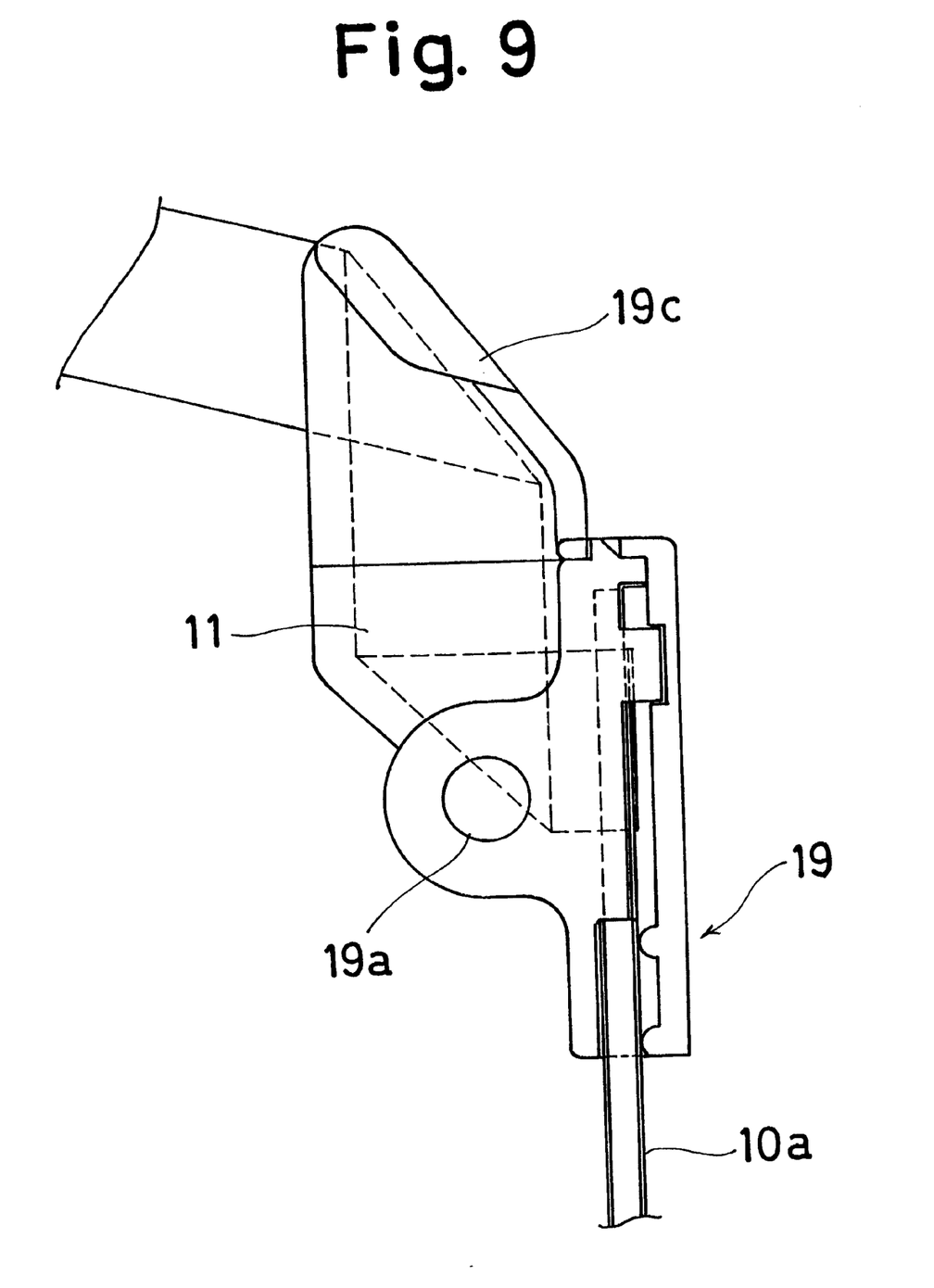
FIG. 9 is a cross-sectional view taken along the section line IX—IX in FIG. 8.
Figure 10:
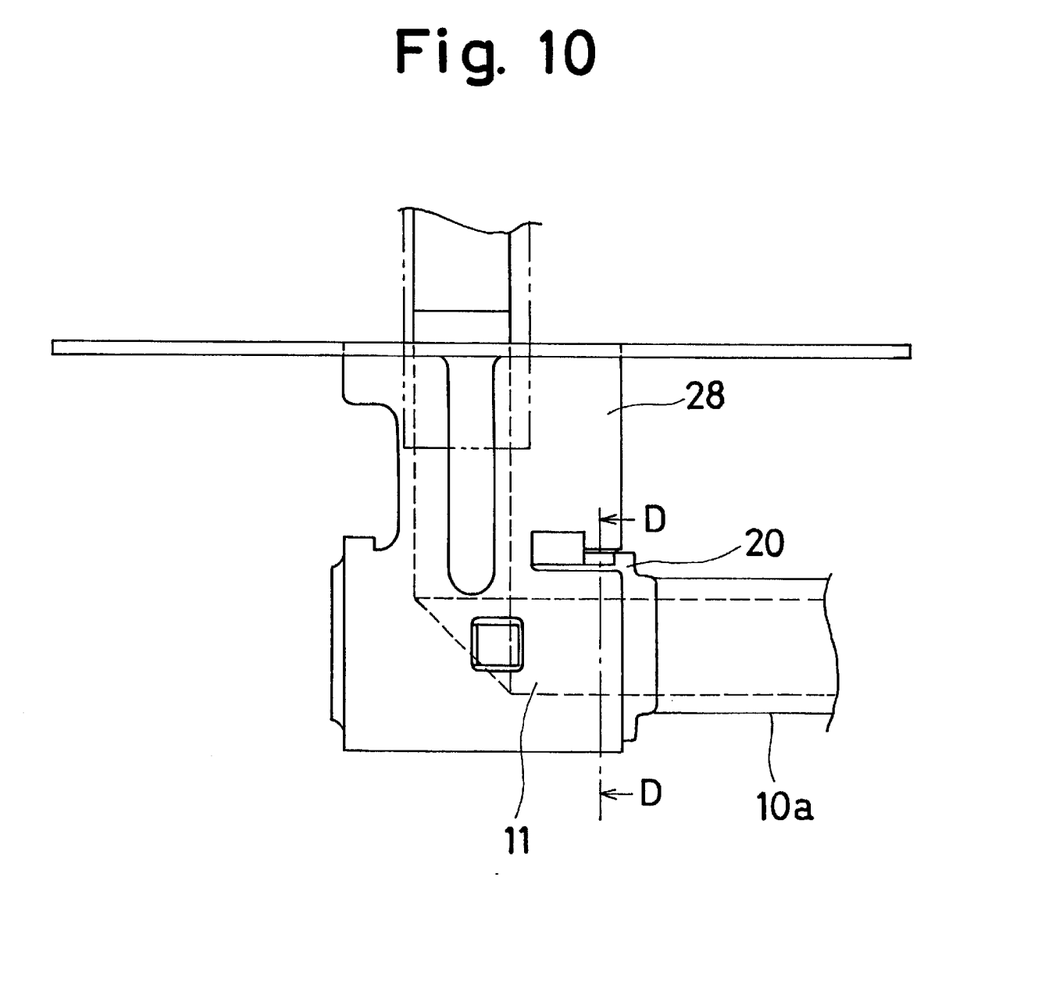
FIG. 10 is an enlarged side view of a portion of the flexible conductive portion in the vicinity of the bracket mounted at one end of the flexible conductive portion.
Figure 11:
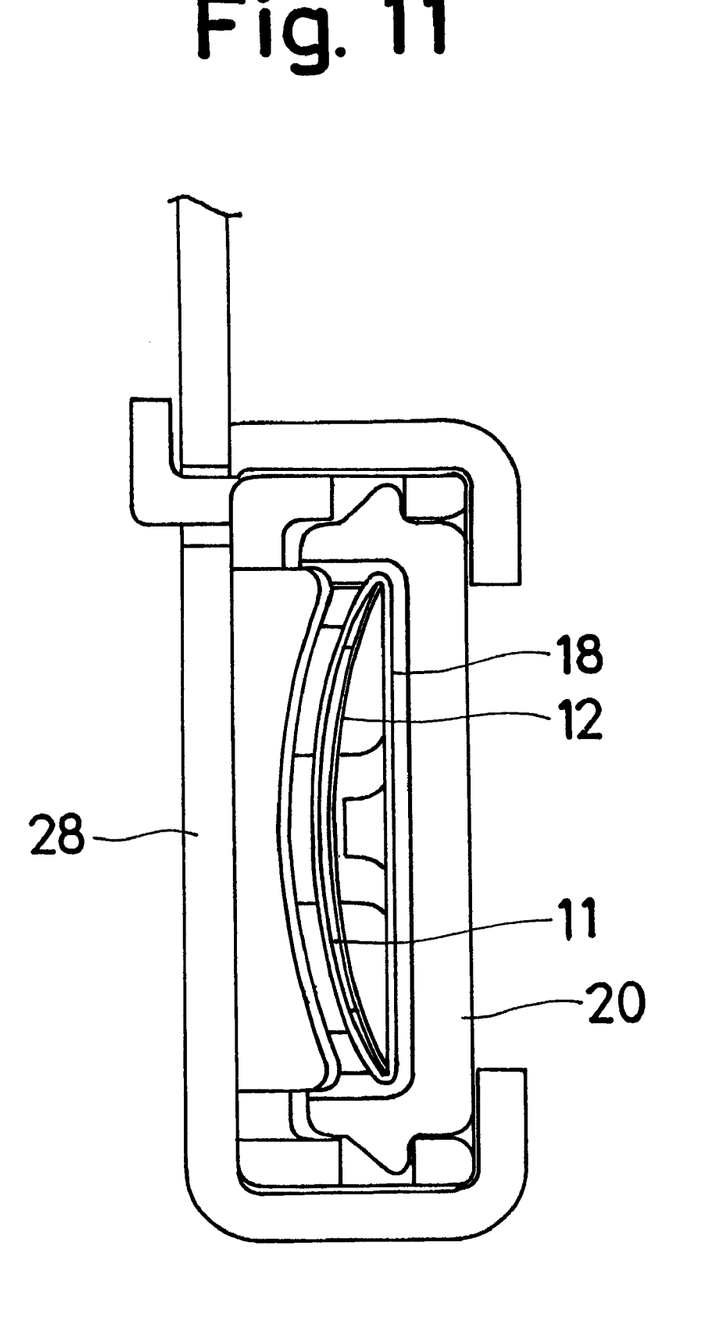
FIG. 11 is a cross-sectional view taken along the section line XI—XI in FIG. 10.

FIG. 7 illustrates the drive device 8 for driving the slide door 1. The drive device 8 is secured by way of a mounting bracket 85 to an inside panel of the lateral side wall 2. The drive device 8 includes a housing 82 in which a speed reduction gear train is accommodated. A motor 81 (e.g., a dc motor) is fixedly mounted on the housing 82 and drives the speed reduction gear train. The drive device 8 also includes a brake device BK which applies a braking force to the geared cable 6 as the cable is moving to adjust the sliding or moving speed of the slide door 1.

When electricity is applied to the motor 82 from a battery by way of an external harness, the motor 82 is turned on in one direction and the resulting rotational torque is transmitted by way of a link mechanism to thereby open the slide door 1. When the motor 82 is applied with electricity from a battery by way of an external harness so that the motor 82 is turned on and operated in the opposite direction, the resulting rotational torque is transmitted by way of the link mechanism to thereby close the slide door 1.

As best shown in FIGS. 1, 4, 5 and 6, the electricity feeding device 10 is used to transmit electric signals from the touch sensor 13 and the inside door handle sensor 14 to the CPU 15. The electricity feeding device 10 also applies electricity to the CPU 15. The CPU 15 controls the sliding movement of the sliding door on the basis of the conditions of an indoor operation switch (not shown) and the electric signals received from both the touch sensor 13 and the inside door handle sensor 14.

The touch sensor 13 is provided along the front vertical end or edge 1a of the slide door area 1 along substantially the full length of the vertical edge and is adapted to detect a sandwiched or pinched condition of an obstacle located between the front vertical periphery of the opening area 21 in the lateral side wall 2 when the slide door 1 is moving towards the closed position for closing the opening area 21. The touch sensor 13 is formed of an electrically conductive elastic material and is configured to posses a hollow structure. The touch sensor 13 is in continual electric coupling with the battery and a fixed amount of current from the battery flows through the touch sensor 13. The amount of current flowing through the touch sensor 13 is outputted, as an electric signal to the CPU 15.

The inside door handle sensor 14 is accommodated in an inside door handle 26 to detect whether or not the inside door handle 26 is manipulated. Only when the inside door handle 26 is manipulated, a current passes through the inside door handle sensor 14 and is detected as an electric signal by the CPU 15.

Figure 4:
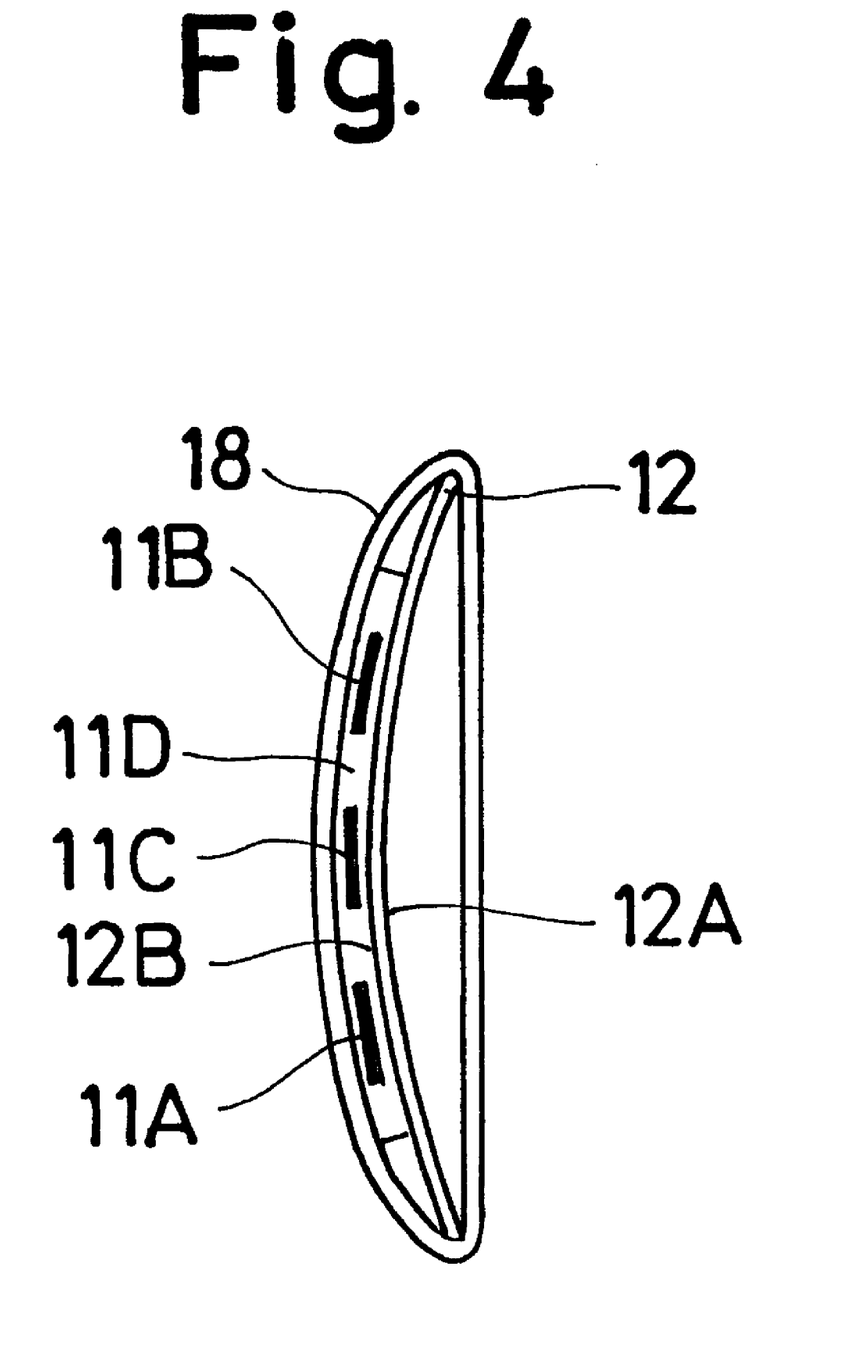
FIG. 4 is a cross-sectional view taken along the section line IV—IV in FIG. 1.
Figure 5:
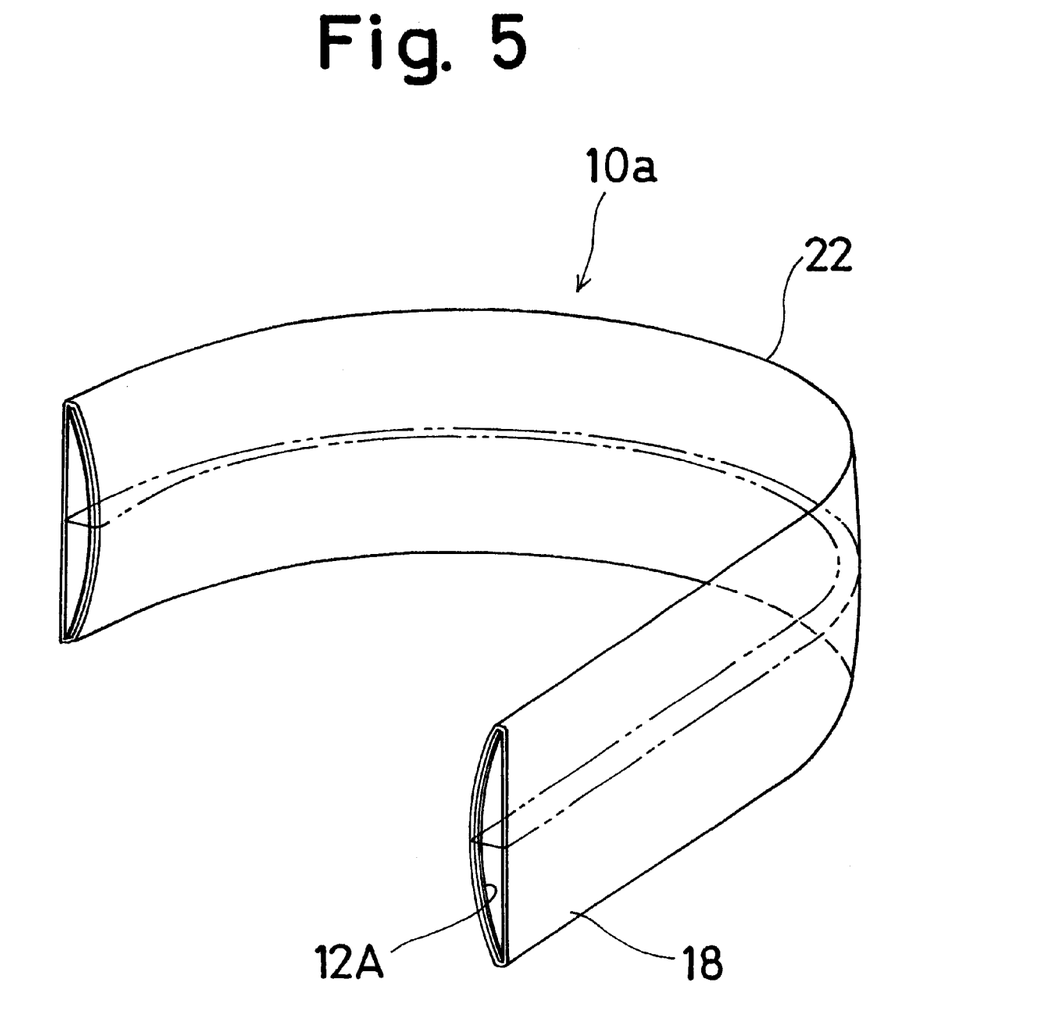
FIG. 5 is a perspective view of the bent portion of the electricity feeding device.

The electricity feeding device 10 includes a flexible conductive portion 10a having independent wires 11A, 11B, 11C, and an insulating member 11D which covers the wires 11A, 11B, 11C . The insulating member 11D in which the wires 11A, 11B, 11C are accommodated possesses a greater widthwise extent than thickness as seen in FIG. 4. The insulating member 11D in which the wires 11A, 11B, 11C are accommodated is supported on an elongated belt 12 which is preferably made of steel. The wire 11A provides an electrical connection between the inside door handle sensor 14 and the CPU 15, the wire 11B provides an electrical connection between the touch sensor 13 and the CPU 15, and the wire 11C provides a common ground for the respective inside door handle sensor 14 and the touch sensor 13. The opposite end portions of the flexible conductive portion 10a is provided with connectors 16, 17. The connector 16 establishes a detachable electric coupling in a single action of one side or end of each of the wires 11A, 11b, 11C to the touch sensor 13, the inside door handle sensor 14, and the CPU 15 respectively. The connector 17 establishes a detachable electric coupling in a single action of one side or end of each of the wires 11A, 11b, 11C to the CPU 15.

In a preferred form of the invention, the belt 12 possesses a thickness of 0.1 mm and is made of metal, preferably tool steel which complies with the Japanese Industrial Standard. The belt 12 may thus be made more rigid than the remainder of the flexible conductive portion 10a. The belt 12 also possesses a width greater than its thickness. As seen in FIG. 4, the belt 12 possesses a curvature as seen in cross-section. That is, the vertical cross-section in the sliding direction of the belt 12 is defined by a convex surface 12B and a concave surface 12A. Also, the belt 12 is movable with respect to the insulating member 11D.

The belt 12 and the insulating member 11D in which the wires 11A, 11B, 11C are embedded are accommodated in a tube 18 which may be made of heat shrinkable material. After inserting the belt 12, with the insulating member 11D and wires 11A, 11B, 11C mounted on the belt 12, into the tube, if water warmed at a high temperature is applied to the tube 18, the tube 18 is shrunk, thereby establishing the condition illustrated in FIG. 5. It is to be noted that the tube 18 has an original axial length which is slightly shorter than the longitudinal length of the belt 12 so that each end of the belt 12 projects by a length of about 20 mm from the corresponding end of the tube 18. The cover 18 is movable relative to both the belt 12 and the insulating member 11D in which is embedded the wires 11A, 11B, 11C.

A bracket 19 made of resin is provided at and connected to one end of the combined tube 18 and belt 12, and a bracket 20 made of resin is provided at and connected to the other end of the combined tube 18 and belt 12. The bracket 19 is secured to the lower arm 27 of the slide door 1 and the bracket 20 is secured to the upper wall of the lower guide rail 42. The flexible conductive portion 10a turns its extending direction in the bracket 19 and the bracket 20 so as to extend towards both of the touch sensor 13 and the inside door handle sensor 14 and the CPU 15, respectively.

As depicted in the dotted line outline in FIGS. 8–11, the flexible conductive portion 10a is bent at the bent portion and is held in each of the brackets 19, 20 and extends therefrom. The bracket 19 is formed with a thread hole 1a for connecting the mounting bracket 27A and an extension regulating portion 19c for regulating the extending direction of the flexible potion 10a. The bracket 19 also has a pin 19b which is used temporally when the bracket 19 is coupled to the mounting bracket 27A. The bracket 20 is secured to the lateral side wall 2 of the vehicle by way of a mounting bracket 28 which may be made of metal.

As explained previously, the flexible conductive portion 10a is bent into a substantially U-shaped structure having the curved or bent portion 22 and operates in such a manner that the curved portion 22 is displaced or moved in conjunction with movement of the slide door 1. In FIG. 1, the curved portion 22 of the flexible conductive portion 10a assumes the position designated [A] when the slide door 1 is in its fully opened condition, assumes the position designated [B] when the slide door 1 is at a midway position between its fully open position and its fully closed position, and assumes the position designated [C] when the slide door 1 is in its fully closed condition. Such a position change of the curved portion 22 of the flexible conductive portion 10a is made within a range of the full length of the tube 18. As indicated by the two-dotted line in FIG. 5 which indicates the distance between the tube 18 and the facing surface of the belt 12, at the curved portion, 22 the cross-section of the belt 12 turns to flat from arc-shape. Thus, the distance between the facing surfaces of the tube 18 and the belt 12 is less in the region of the curved portion than in regions of the flexible conductive portion 10a outside the curved portion.

The operation of the slide door and the electricity feeding device is as follows. When the operation switch is turned on to open the slide door 1, an electric signal is fed to the CPU 12. On the basis of this electric signal, the CPU 15 orders the motor 81 to operate, thereby sliding the slide door 1 to the open position. At the time when the slide door 1 is opened, if the inside door handle 26 is manipulated, the inside door handle sensor 14 is activated, thereby feeding an electric signal to the CPU 15. Then, the CPU 15 orders the motor 81 to operate or drive in the reverse direction, thereby moving the slide door 1 to the closed position. If an obstacle is positioned between the vertical inner periphery of the opening area 21 in the lateral side wall 2 and the front vertical periphery 1a of the slide door 1 in motion, the touch sensor 13 deforms and causes an increase in current passing through the touch sensor 13. The resulting current is fed by way of the electricity feeding device 10 to the CPU 15, and the CPU 15 recognizes the occurrence of a sandwiched or pinched condition. The CPU 15 stops the motor 81 and reverses the motor operation 81 to open the slide door 81. Thus, the sandwiched or pinched condition is immediately released.

The flexible conductive portion 10a of the electricity feeding device 10 is interposed between the slide door 1 and the side wall 2 of the vehicle in such a manner that the concave surface 12A of the belt 12 is positioned or faces outside. The curved portion 22 of the flexible conductive portion 10a is displaced or moved in conjunction with movement of the slide door 1 as shown in FIG. 1. In this embodiment, the concave surface 12A and the convex surface 12B of the belt 12 are positioned outside and inside, respectively. This means that the curving direction of the concave surface 12A is against or in opposition to the bending direction of the curved portion 22, which causes an increase in the force to retain or maintain the belt 12 in a straight condition, thereby increasing the force which restricts an outward expansion of the bent portion 22. Thus, in spite of the displacement of the curved portion 22 of the flexible conductive portion 10a in conjunction with the movement of the slide door 1, the curved portion 22 and its adjoining portion is prevented or substantially prevented from expanding outwardly. This means that the displacement of the belt 12 occurs under restricted conditions, thereby ensuring that the displacement of the curved portion 22 is made within the width of the brackets 19, 20.

As explained above, the outward expansion of the curved portion 22 of the flexible conductive portion 10a can be restricted to expand outwardly by modifying the cross-section of the belt 12 which is one of main elements of the flexible conductive portion 10a. Thus, the flexible conductive portion 10a of the electricity feeding device 10 becomes free from sliding engagement with elements defining its moving path. The life of the device is thus prolonged. In addition, restrictions on the positioning of the electricity feeding device become lessened.

In addition, enclosing the belt and the insulating member within the tubular cover member assists in avoiding difficulties associated with other known constructions such as described above.

The principles, preferred embodiments and modes of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. An electricity feeding device for a vehicle slide door mounted on a side wall of a vehicle body comprising;

a flexible conductive portion having a curved portion, the curved portion being moved in conjunction with movement of the slide door for opening and closing an opening area formed in the side wall of the vehicle body;

the flexible conductive portion having a wire providing electrical connection between components in the slide door and the vehicle body, and an insulating member covering the wire;

a belt made of steel and extending along the insulating member with the insulating member being supported on the belt; and a cover member covering the belt and the insulating member covering the wire so that the cover member is movable relative to the insulating member, and the belt being movable relative to the insulating member.

2. The electricity feeding device as set forth in claim 1, wherein the cover member is a tube made of heat shrinkable material.

3. The electricity feeding device as set forth in claim 1, wherein the insulating member covers a plurality of wires.

4. An electricity feeding device for a vehicle slide door mounted on a side wall of a vehicle body comprising;

a flexible conductive portion having a curved portion, the curved portion being moved in conjunction with movement of the slide door for opening and closing an opening area formed in the side wall of the vehicle body, the flexible conductive portion including a wire encased within insulation and providing electrical connection between components in the slide door and the vehicle body, a support member on which the wire encased in insulation is supported, and a cover member extending around an entirety of the circumference of the support member and the wire encased within insulation, the support member being movable relative to the wire encased within insulation.

5. The electricity feeding device as set forth in claim 4, wherein the cover member is a tube made of heat shrinkable material.

6. The electricity feeding device as set forth in claim 4, wherein the flexible conductive portion includes a plurality of wires encased within the insulation.

7. The electricity feeding device as set forth in claim 4, wherein the cover member is movable relative to the support member.

8. The electricity feeding device as set forth in claim 4, wherein the support member is made of metal.

9. A vehicle slide door apparatus comprising:

a slide door mounted on a lateral side of a vehicle body for movement relative to the vehicle body between an open position and a closed position; and a flexible conductive portion having a curved portion, the curved portion being moved in conjunction with movement of the slide door between the open and closed positions, the flexible conductive portion including a wire encased within insulation and providing electrical connection between components in the slide door and the vehicle body, a support member on which the wire encased in insulation is supported, and a cover member extending around an entirety of the circumference of the support member and the wire encased within insulation, the support member being movable relative to the insulation.

10. The electricity feeding device as set forth in claim 9, wherein the cover member is a tube made of heat shrinkable material.

11. The electricity feeding device as set forth in claim 9, wherein the flexible conductive portion includes a plurality of wires encased within the insulation.

12. The electricity feeding device as set forth in claim 9, wherein the cover member is movable relative to the support member and relative to the wire encased in insulation.

13. The electricity feeding device as set forth in claim 9, wherein the support member is movable relative to the wire encased within the insulation.

14. The electricity feeding device as set forth in claim 9, wherein the support member is made of metal.

15. The electricity feeding device as set forth in claim 9, wherein the wire extends beyond ends of the cover member.

* * * * *